(12) United States Patent
Leong et al.

(10) Patent No.: US 9,558,204 B2
(45) Date of Patent: Jan. 31, 2017

(54) SYSTEM AND METHOD FOR MANAGING INFORMATION RETRIEVALS FOR INTEGRATED DIGITAL AND ANALOG ARCHIVES ON A GLOBAL BASIS

(71) Applicant: JPMorgan Chase Bank N.A., New York, NY (US)

(72) Inventors: Sang Leong, Matawan, NJ (US); William Telkowski, Lincoln University, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 199 days.

(21) Appl. No.: 13/647,604

(22) Filed: Oct. 9, 2012

(65) Prior Publication Data
US 2013/0036199 A1 Feb. 7, 2013

Related U.S. Application Data

(63) Continuation of application No. 11/028,061, filed on Jan. 4, 2005, now Pat. No. 8,255,568, which is a (Continued)

(51) Int. Cl.
*G06F 15/16* (2006.01)
*G06F 17/30* (2006.01)

(52) U.S. Cl.
CPC ... *G06F 17/30194* (2013.01); *G06F 17/30073* (2013.01); *G06F 17/30126* (2013.01)

(58) Field of Classification Search
CPC .................. G06F 17/30073; G06F 17/30126; G06F 17/30194

(Continued)

(56) References Cited

U.S. PATENT DOCUMENTS 1,699,875 A 1/1929 Burgess
5,052,649 A 10/1991 Hunnicutt
(Continued)

OTHER PUBLICATIONS

Ashizawa, M., et al., "Using digital libraries as a community hall for worldwide information spiral development," Transactins of the Institute of Electronics, Information and Communication Engineers D-II, May 1998, Inst. Electron. Inf. & Commun. Eng. Eng., Japan, vol. J81D-II, No. 5, pp. 1014-1024, XP00910377.
(Continued)

*Primary Examiner* — Douglas Blair
(74) *Attorney, Agent, or Firm* — Goodwin Procter LLP

(57) ABSTRACT

A system and method for managing information retrievals from all of an enterprises' archives across all operating locations. The archives include both digital and analog archives. A single "virtual archive" is provided which links all of the archives of the enterprise, regardless of the location or configuration of the archive. The virtual archive allows for data aggregation (regardless of location) so the a user can have data from multiple physical locations on a single screen in a single view. A single, consistent and user friendly interface is provided through which users are able to access multiple applications through a single sign-on and password. Logical tables that are used to direct information retrieval requests to the physical archives. The retrieved information is reformatted and repackaging to resolve any incompatibility between the format of the stored information and the distribution media.

25 Claims, 8 Drawing Sheets

Related U.S. Application Data continuation of application No. 10/413,994, filed on Apr. 16, 2003, now Pat. No. 6,886,047, which is a continuation-in-part of application No. 09/439,909, filed on Nov. 12, 1999, now Pat. No. 6,557,039.

(60) Provisional application No. 60/108,245, filed on Nov. 13, 1998.

(58) Field of Classification Search
USPC .................................................. 709/217, 246
See application file for complete search history.

(56) References Cited

U.S. PATENT DOCUMENTS

| | | | |
|---|---|---|---|
| 5,088,673 A | 2/1992 | Chandler | |
| 5,174,534 A | 12/1992 | Mitchell | |
| 5,351,928 A | 10/1994 | Cooper et al. | |
| 5,490,653 A | 2/1996 | Ingwersen | |
| 5,601,268 A | 2/1997 | Dunchock | |
| D381,264 S | 7/1997 | Lippincott | |
| 5,676,340 A | 10/1997 | Ruhnau | |
| 5,706,457 A | 1/1998 | Dwyer et al. | |
| 5,732,214 A * | 3/1998 | Subrahmanyam | 709/227 |
| 5,764,972 A * | 6/1998 | Crouse et al. | |
| 5,790,789 A * | 8/1998 | Suarez | 709/202 |
| 5,870,545 A * | 2/1999 | Davis et al. | 709/201 |
| 5,903,889 A * | 5/1999 | de la Huerga et al. | |
| 5,937,388 A * | 8/1999 | Davis et al. | 705/7.26 |
| 5,956,733 A * | 9/1999 | Nakano et al. | |
| 6,018,627 A * | 1/2000 | Iyengar et al. | 717/103 |
| 6,109,580 A | 8/2000 | Stern et al. | |
| 6,113,049 A | 9/2000 | Miljanich | |
| 6,115,035 A * | 9/2000 | Compton et al. | 715/717 |
| D432,409 S | 10/2000 | Feldmeier | |
| 6,144,797 A * | 11/2000 | MacCormack et al. | 386/224 |
| D443,510 S | 6/2001 | Doucette | |
| D446,719 S | 8/2001 | Garraway | |
| 6,304,967 B1 * | 10/2001 | Braddy | 713/150 |
| 6,308,171 B1 * | 10/2001 | De La Huerga | |
| 6,388,687 B1 | 5/2002 | Brackett et al. | |
| D458,084 S | 6/2002 | Hudson | |
| 6,411,724 B1 | 6/2002 | Vaithilingam et al. | |
| 6,442,296 B1 | 8/2002 | Smith et al. | |
| D469,310 S | 1/2003 | Bukowski | |
| D471,766 S | 3/2003 | Bradley et al. | |
| 6,554,504 B2 | 4/2003 | Cook et al. | |
| 6,557,039 B1 * | 4/2003 | Leong et al. | 709/229 |
| 6,568,543 B1 | 5/2003 | Schneider | |
| 6,714,968 B1 | 3/2004 | Prust | |
| 6,735,623 B1 | 5/2004 | Prust | |
| 6,886,047 B2 * | 4/2005 | Leong et al. | 709/246 |
| 6,925,481 B2 | 8/2005 | Singhal | |
| 6,929,117 B1 | 8/2005 | Cohen | |
| 6,952,724 B2 | 10/2005 | Prust | |
| 7,013,298 B1 * | 3/2006 | De La Huerga | |
| D536,615 S | 2/2007 | Dziaba et al. | |
| D538,655 S | 3/2007 | Dziaba et al. | |
| 7,254,621 B2 | 8/2007 | Singhal | |
| 2001/0032791 A1 | 10/2001 | Hudson | |
| 2002/0023992 A1 | 2/2002 | Veltri et al. | |
| 2002/0043603 A1 | 4/2002 | Thomas | |
| 2002/0108880 A1 | 8/2002 | Krupa et al. | |
| 2002/0116509 A1 * | 8/2002 | DeLaHuerga | 709/229 |
| 2002/0185578 A1 | 12/2002 | Hudson | |
| 2003/0141424 A1 | 7/2003 | Thomas | |
| 2005/0216421 A1 * | 9/2005 | Barry et al. | 705/64 |

OTHER PUBLICATIONS

Bhasker, B., et al., "Architecture and implementation of an on-line data archive and distribution system," Proceedings Twelfth IEEE Symposium on Mass Storage Systems. Putting All That Data to Work (CAT. No. 93CH3246-6), Proceedings of 12th IEEE Symposium on Mass Storage Systems, Monterey, CA, USA Apr. 26-29, 1993, pp. 177-182, XP002138055 1993, Los Alamitos, CA, USA IEEE Comput. Soc. Press, USA ISBN:0-8186-3460-X.

Nancy McGough, Archie, FTP, and Uncompression (Aug. 16, 1993) http://ww.ii.com/internet/ftp/archie_ftp_uncompression.

Ftpsearch, (1997) http://ftpsearch.ntnu.no/pub/ftpsearch.

* cited by examiner

SYSTEM AND METHOD FOR MANAGING INFORMATION RETRIEVALS FOR INTEGRATED DIGITAL AND ANALOG ARCHIVES ON A GLOBAL BASIS

CROSS REFERENCE TO RELATED APPLICATIONS

This patent application is a continuation of U.S. patent application Ser. No. 13/475,164, filed on May 18, 2012, which is a continuation of U.S. patent Ser. No. 11/028,061, filed on Jan. 4, 2005, which is a continuation of U.S. patent application Ser. No. 10/413,994 filed on Apr. 16, 2003, now U.S. Pat. No. 6,886,047, which is a CIP of Ser. No. 09/439,909, filed on Nov. 12, 1999, now U.S. Pat. No. 6,557,039, which claims priority from Provisional Application No. 60/108,245, filed on Nov. 13, 1998, all of which are hereby incorporated in their entirety.

FIELD OF THE INVENTION

The present invention generally relates to systems and methods for electronic information retrieval and more particularly to systems and methods for retrieving information from logically and geographically distributed and incompatible storage devices containing both digital and analog content.

BACKGROUND OF THE INVENTION

Historically, corporations have used paper, microfilm and microfiche media for the long term storage of information important to the corporation. Each of these types storage media can take massive amount of physical storage space, and require considerable effort when the retrieval of stored information is necessary. Such media are still widely in use, both for historical and current archiving of information. Electronic storage archives have been developed that enable large electronic repositories that facilitate relatively easy retrieval of electronic files. Typically, these electronic storage archives allow the long term archival of document bitmap images, computer generated reports, office documents (e.g., word processing documents and spreadsheets), audio and video files, etc.

The hardware typically incorporated in an electronic archive is comprised of a general purpose computer and storage devices (such as magnetic disks, optical disks and magnetic tape subsystems). The hardware is typically operated and accessed by software comprising an operating system, database management systems, hierarchical storage management software (HSM) and archive management software. There are at least four significant limitations associated with current long term archival systems. First, larger corporations will invariably require several geographically diverse heterogenous archival systems in order to support the various operations of the corporation throughout the country and the world. For example, The corporation's research and development facility in London England has a separate archival system from the archival system for one of the corporation's manufacturing sites in Dallas Tex. Even if each of the archive facilities has a heterogeneous archival (e.g., a database manager) the hardware and the software comprising the archival at the two sites is invariably provided by two different vendors whose proprietary product are not interoperable (i.e., the software at the London site cannot be used to access the information stored at the Dallas site).

A related second problem is that even if the hardware and the software at the London and Dallas are from the same vendor, the corporation will typically not have any mechanism for managing information accesses at the enterprise level, treating all of the corporation's archives as single resource regardless of the location.

A third significant problem is that an electronic document stored in one format can only be used by the specific retrieval applications that support that document storage format. Frequently, retrieval applications have very different formatting requirements, thus creating further compatibility problems. For example, a check image contained in the archive facility of a bank is typically in TIFF-JPEG or TIFF-G4 format while the image of a bank statement is typically in IBM AFP, Xerox Metacode or Adobe PDF format. The retrieval application (e.g., Netscape or Microsoft browser) or device (Palm PC, smartphone) frequently cannot display images in the format in which the images are stored. Although both electronic files are images, they cannot be retrieved by the same retrieval application. This compatibility problem severely limits the range of retrieval solutions and frequently increases the cost and time in building custom file conversion functions.

Analog archives, in particular microfilm and microfiche media, is fairly well entrenched in some corporations and government agencies. The rate of migration to digital repositories in these organizations has been slower than expected.

One reason for hesitation in abandoning analog archives are technology obsolescence issues dealing with digital storage media and digital file formats over the very long term future. For example, some corporations archived data on eight inch or five and one quarter inch floppy disks. Finding the disk drives to even accept these disks, let alone the operating systems to read them is a daunting task. It has been challenging to prove that digital objects can be preserved and viewable beyond 50 years. Analog media (paper, microfilm, microfiche, and ion beam etching) can last hundreds of years and can be read with ubiquitous optical systems that are easily available or even replicable. Digital media (tapes, diskettes, optical storage (e.g., Compact Disks)) also degrade over time (e.g., 15-25 years) and must be re-recorded to preserve the information encoded thereon.

One further reason that some businesses have been slow to embrace digital archiving is that digitizing analog media can be very expensive. Many customers leave historical analog media 'as is' while using digital repositories on 'day forward' documents.

A final significant limitation with current archive systems is that these systems impose great challenges in applying enterprise level management and control processes including consolidated usage tracking and billing information; performance measurement and management; uniform access and retrieval application and security and a uniform look and feel for document displays.

Accordingly, it is an object of the present invention to allow users to have a unified information retrieval front-end and user experience across all digital as well as analog information repositories. It is a further object to facilitate a gradual migration path for users from analog to digital repositories.

SUMMARY OF THE INVENTION

In light of the above problems associated with the traditional archive retrieval systems, the present invention manages information retrievals from all of an enterprises' archives across all operating locations. All of the electronic archives as well as analog archives, regardless of the location, configuration or vendor makeup are linked to provide a single global framework for managing archive access. It thus provides system developers with a single "virtual archive" for accessing all of the enterprises' stored data, without the need to have location dependent programming code.

A first aspect of the present invention is the user interface. The goal achieved by the present invention with respect to the interface is to provide a single, consistent and user friendly interface. This is accomplished through the use of an intranet access portal. This single entry point for users is preferably enabled using a browser which provides access for the user to several retrieval application. By the use of a single entry point, users are able to access multiple applications through a single sign-on and password.

A second significant aspect of the present invention is the use of logical tables ("meta-descriptors") that are used to direct information retrieval requests to the physical electronic archives. By the use of these tables, no change what-so-ever (hardware or software) is required to the archives. The tables provide a high degree of location independence to information retrieval applications by creating a "virtual archive." This concept of a "virtual archive" provides for rapid application development and deployment, resulting in lower development and maintenance costs. The virtual archive furthermore allows for data aggregation (regardless of location) so the a user can have data from multiple physical locations on a single screen in a single view.

A third aspect of the present invention is the functionality of reformatting and repackaging the retrieved information. This is required because of the above described incompatibility between the format of the stored information and the distribution media. A final function performed by the present invention is automatic disaster recovery.

A further significant aspect of the present invention is the use of statistical analysis techniques in providing the requester with predicted response time based on historical performance of request queues. Depending on the requested object type, storage media of the requested object, overall archive workload factors and equipment (e.g., number and availability of tape drives), etc., the response time may be sub-second or several minutes. Using empirical performance statistics, multiple performance profile models (PPM's) are developed. Each retrieval request is classified with a matching PPM, and a delay factor (in seconds or minutes) is sent to the requesting application or user whenever response delays are expected.

In one embodiment of the invention, users of the digital repositories of the present invention are provided with the capability to also have a duplicated copy on analog media. The digital document is typically used for regular operation purpose while the analog copy is typically intended only for very long term document preservation.

The present invention provides significant advantages to a corporation over the existing archive systems. Document archives can be consolidated at strategic locations globally. Each location archive can serve the archival needs for all product and service lines of the corporation and provide generic storage capability covering a broad range of objects including office documents, document images, computer print reports, etc. Each business division of the corporation can leverage and share document management products developed by other divisions at much reduced costs and lead-time. The present invention allows many business divisions to have presence at multiple global geographical locations. A document archival infrastructure that could be leveraged on a global basis facilitates a global service reach objective. Many new information retrieval products (e.g. customer Internet retrievals) can be provided though a single customer access point regardless of physical storage locations. This level of transparency in customer accesses to consolidated global information can be critical to a corporation's competitiveness in the new information age. Furthermore, since the present invention allows to user to access both digital and analog media using the same integrated front end, the invention facilitates a gradual migration path for users from analog to digital repositories.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
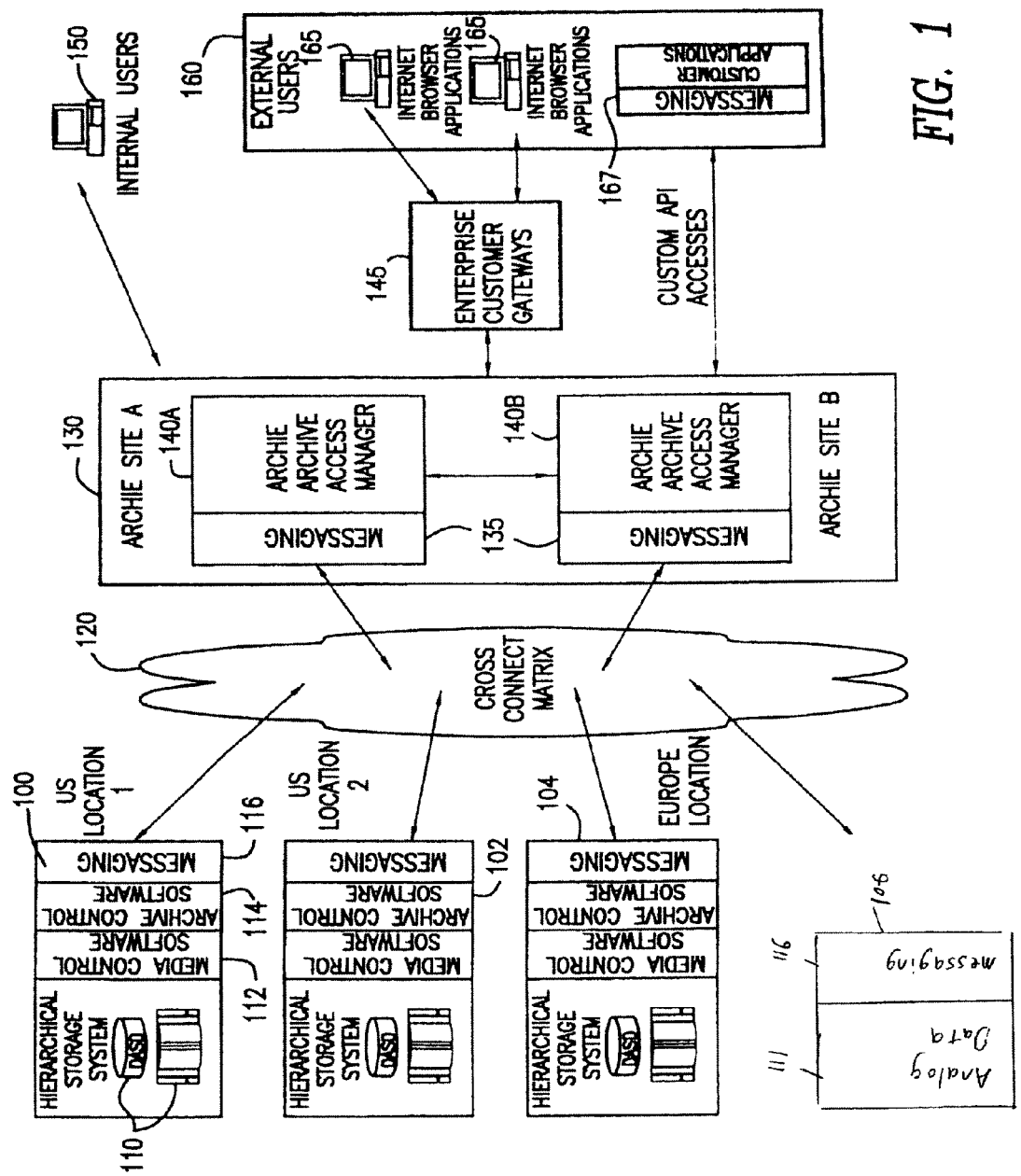
FIG. 1 depicts a high level diagram illustrating the components of the archive manager of the present invention.

FIG. 1 illustrates, at a high level, the system of the present invention and its relationship with respect to the electronic archives 100-106 of an enterprise and with respect to users 150, 160 of those archives. Illustrated in FIG. 1 are four different archives. Archives 100 and 102 represent domestically located archives while archive 104 is located in Europe. Element 106 represents an analog archive facility containing analog archives 111. Although only four archives 100-106 are depicted in this Figure, the present invention is scalable such that the access to any number of electronic archives can be managed by the present invention. The archives 100-106 are heterogeneous in configuration meaning that they are constructed of diverse constituent elements (e.g., hardware and software) and store a wide diversity of types of information.

Schematically included in each of the archives 100-104 are the physical storage devices 110, the software 112 for accessing the physical devices 110, the site specific software 114 for controlling access to archived information, and site specific messaging system 116 for communication with a site. Typical storage devices 102 include Direct Access Storage Devices (DASD), optical storage devices and magnetic tape devices. These storage devices are typically configured in a hierarchical manner such that information that is more recent or that is more often accessed is stored on devices with the quickest access time, for example DASD. Using conventional archiving techniques, as electronic information "ages", it is migrated for archival purposes from DASD to devices with a slower access time such as optical disks or magnetic tape. Optical disks and tape provide a cost effective means for the storage of large quantities of electronic information. Tapes are typically stored and accessed through tape silos while a large quantity of optical disks are stored and accessed from one or more jukeboxes. Some specific examples of storage devices 110 include IBM and EMC magnetic disks, STK magnetic tape silos, Boxhill RAID magnetic disks, and Hewlett Packard magneto-optical jukeboxes.

Element 106 represents an analog archive facility that contains at least one analog storage device 111. Such a device includes microfilm, microfiche and ion beam etched devices. For the purposes of information retrieval with respect to the present invention, these devices 111 broadly fall into two types of categories, those with a digital index and those without.

In the process of creating an analog document (e.g., using a KODAK Digital Writer device to create microfilm), a digital index is preferably created. This digital index is used for future data retrievals from the analog archive 111 (e.g., film roll number, film starting frame position, number of frames). The index information is stored in a digital archive. At retrieval time, the retrieval system 130 (discussed in further detail below) first consults the digital index on the digital archive, then uses the index information to request the stored information (e.g., a document) from the analog archive 106 facility.

The analog archive facility 106 acts on the request, manually locates the analog document, digitizes the document (e.g., using a microfilm scanner) into a standard digital file (e.g. TIFF file) then returns the digital document to system 130 (discussed in further detail below).

It is possible that future new technology will allow analog archives to be managed by automated library technology, similar to automated magnetic tape silos, e.g. robotic arms to pick the requested microfilm cartridge, spool and advance microfilm to the requested starting frame, scan/digitize the number of microfilm frames into a digital file.

Many analog archives 111 do not have a digital index associated therewith. Traditional microfilm archives typically rely on paper or microfiche reports as index information. There is accordingly no digital index to assist the user or the retrieval personnel in the retrieval process.

Under the present invention, system 130 permits the user to send a free format text message to the analog archive area 106. The request describes the information being requested (e.g., a document) for example by the date or date range of the document. The personnel manning the analog archive area 106 acts on the request, manually locates the analog document(s), digitize the document (microfilm scanner) into a standard digital file (e.g. TIFF file) then return the digital document to the Archive Access Manager.

In a preferred embodiment of the present invention, the corporation is a financial institution (e.g., a bank) and the electronic information that is stored in storage devices 110 is generated an relied upon during the normal course of business for the institution. The banking industry furthermore has special regulations as to the storage and retention of certain type of documents such as checks. The following are some examples of the type of information stored in devices 110 by a bank and some of the different types of format in which the same data can be stored. Check images and document images can be stored in the following formats: TIFF/JPEG Multi-page; TIFF/G4 Multi-page; Federal Reserve bank Common Output Format (COF); TIFF/ABIC (gray scale or binary); IOCA/ABIC (gray scale or binary); MOD:CA/G4; JPEG; GIF; Encrypted binary files; and BLOB (binary large object). Computer reports and statements can be stored as: IBM AFP; Xerox Metacode; Adobe PostScript; HP PCL; Adobe PDF; ASCII text; and EBCDII text. Office documents can be stored for example as Microsoft Word document, Excel or PowerPoint files or as HTML files. Other Objects which are stored in archive storage devices 110 include XML documents, Audio files (WAV, MP3, etc), Video files (MPEG2, MPEG3, AVI, etc).

Each digital archival site 100-104 has its own specific set of media control application software 112 that is used to access the electronic information stored on the physical devices 110 located at the site. The type of media control software 112 will depend on the types and number of devices located at the site. Furthermore, even if two sites 100-104 have the same types of hardware devices 110, the media control software 112 employed at a particular site is very likely provided by a particular vendor and therefore be incompatible with the media control software 112 at a different site which has been provided by a different vendor. The same is true of the archival control software 114. This software is the application or suite of applications which provides the user interface for accessing all of the stored electronic information stores in the archives at a site 100-104. The archival control software 114 interfaces with the media control software 112 and is therefore site specific. The media control software 112 and archival control software 114 are typically hosted on hardware such as IBM RS6000 SP computers or Sun Microsystems servers and includes such software as IBM AIX or SUN Solaris operating systems, IBM DB2 DBMS, IBM OnDemand archive manager, IBM ADSM media manager, and SYBASE System 11 DBMS AMASS storage manager. The present invention maintains a profile of each of the archives through the use of tables. A preferred format of the archive application profile table is illustrated in Table 1.

As seen in FIG. 1, the archival control software 114 also interfaces with the software component of the messaging system 116 employed at each site. The messaging system 116 will also vary from site to site, typically being provided by different vendors such as the MQSeries from the IBM corporation.

The electronic messaging system 116 is also used to deliver a user request to the Analog Archive service location 106. Preferably, the messaging system 116 delivers a work ticket that is printed with the request details (archive, e.g., customer ID, Request ID, Request date/time, film roll number, film starting frame position, number of frames for indexed). Using such a work ticket, the operator at the analog archive 106 is able to locate the analog document. If the analog archive 111 in facility 106 is a microfilm archive 111, the operator scans the microfilm using a microfilm scanner and creates a digital file. If archive 111 is a paper archive, the operator scans the paper document using an optical scanner to create a digital file. Similar scanning devices exist for other types of analog archives 111 (e.g., microfiche and ion beam etching) that allow the operator to create a digital copy of the requested analog document.

Element 130 represents major components of the archive access system of the present invention, the system 130 contains two archive access managers 140A and 140B. In accordance with conventional disaster recovery techniques, one of the access managers 140A is located at physical site A and the second access manager 140B is located at a physical site B. The operations between these sites A and B are mirrored thereby providing quick recovery should one or the other of the sites experience an outage. Either of the sites 140A or 140B is capable of handling the complete load of the system 130. Each of the access managers 140A and 140B communicates with the geographically distributed archives 100-106 though messaging systems 135 and a cross connect matrix 120. The cross connect matrix allows both of the sites 140A and 140B to communicate with any of the messaging systems 116 at the various sites 100-106. In one embodiment of the present invention the cross connect matrix 120 consists of the public Internet.

Three different user interfaces are depicted in relation to the archive system 130. The first is for employees of the corporation 150 denoted as internal users. This interface can be enabled through the Internet using common browser technology, through a client/server configuration or through a customer. Application Program Interface (API) specially developed for access to the archive management system 130. The other two classes of interfaces are similar, but are used by external users, typically customers of the corporation. In one embodiment, an external user 165 uses an Internet browser application to connect to the system 130 through a customer gateway 145. The gateway 145 comprises the proper security mechanisms, for example a firewall, to ensure that only authorized users are allowed to connect to the system 130 and eventually the archives 100-106. The last user interface shown in FIG. 1 is by an eternal user 167 through a custom API developed especially for access to the system 130. This type of interface would be used by a customer with special needs such as requiring special access or the transference of large amount of data on a regular basis. As with the gateways 145, access to system 130 through the custom APIs is controlled using proper and conventional security mechanisms. The details of each of the requesting applications employed by the various users 150, 160 of the system are kept in tables. Table 2 illustrates a preferred format of the requesting application tables. These tables allow system 140 to quickly identify the requesting application and all of the parameters associated with the application.

Figure 2:
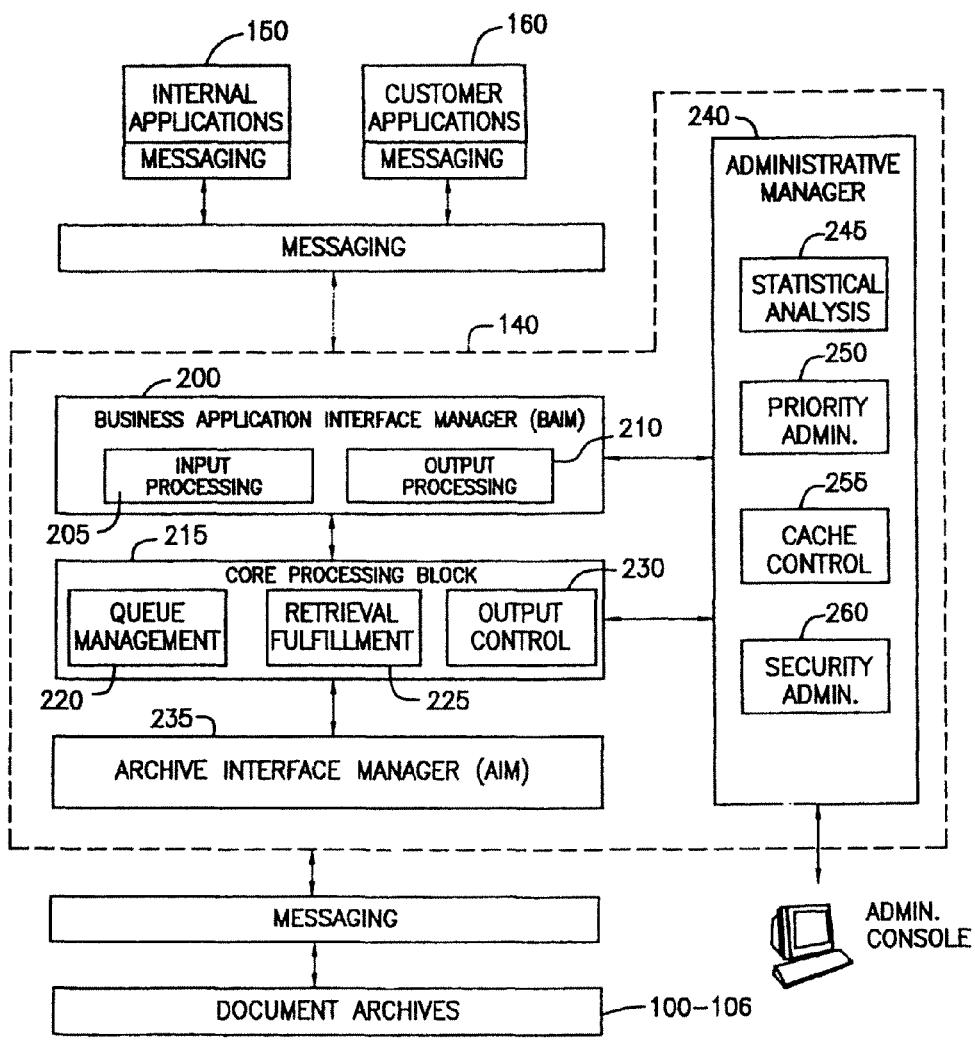
FIG. 2 illustrates the main component parts of the archive access manager of the present invention.

FIG. 2 illustrates the main component parts of the archive access manager 140 of the present invention. The archive access manager 140 discussed with respect to this Figure is the configuration of both of the archive access managers 140A and 140B discussed with respect to FIG. 1. The four main components are a Business Application Interface Manager (BAIM) 200, a Core Processing Module (CPM) 215, an Archive interface manager (AIM) 235, and an Administrative manager 240. In overview, the BAIM 200 provides the user interface for receiving requests for archived data from customers 150, 160 and for transmitting the requested data back to the customer 150, 160 once the archived data has been retrieved. The CPM 215 is responsible for the management of file retrievals and reformatting of data. The AIM 235 performs the actual retrievals of electronic information from the various archives 100-106. The Administrative Manager 240 performs various administrative functions with respect the operation of the archive access system 140.

Figure 3:
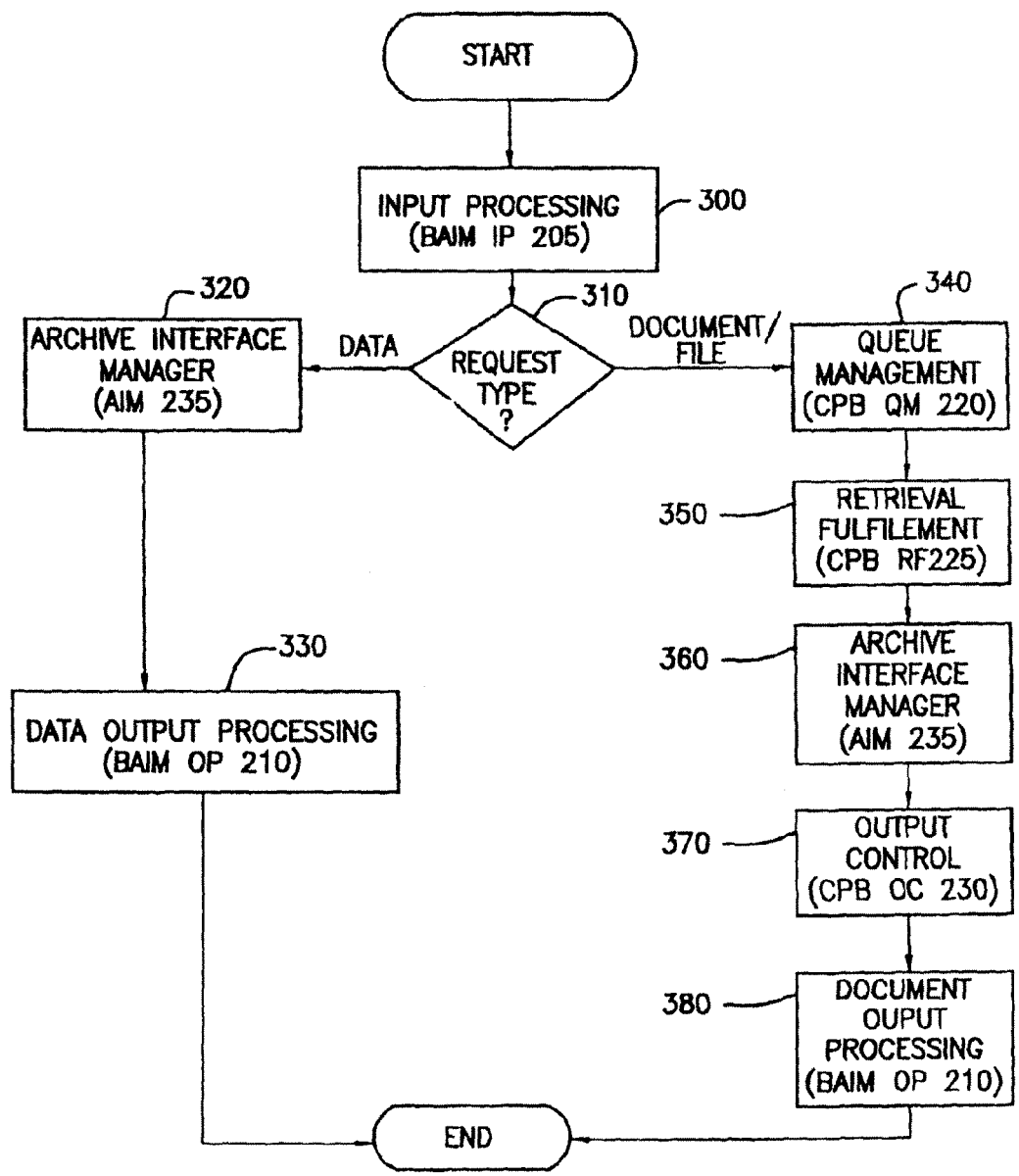
FIG. 3 depicts an overview of the processing and flow of information through archive access system.

FIG. 3 depicts an overview of the processing and flow of information through archive access system 140. In step 300 the BAIM Input Processing section 205 (see FIG. 2) receives and processes information requests from users. It is determined in step 310 what type of information is being requested. If the information is data which can be located using database indexes, the request is forwarded to the AIM module 235 in step 320 which retrieves the data from the archives 100-106. Upon retrieval of the data, it is processed in step 330 for presentation to the user by the Output Processing module 210 of the BAIM 200. In a preferred embodiment, this retrieval occurs in two steps. First, the relevant index is retrieved and presented to the user (e.g., the user requests to see checks for the month of August from a particular account). When the user selects particular data items to view from the retrieved index, the system 140 retrieves the actual data for presentation to the user. Since indexed data is typically stored on DASD (quick retrieval time) the more complex retrieval process (e.g., prioritization) employed for the retrieval of documents described below is not required but could be used.

If the requested information is a document or a file, the request is queued in step 340 by the Queue Management section 220 of the CPB 220. The streamlined process described above with respect to data retrievals is less effective for documents or other files (e.g., images) since these types of electronic information are more likely archived in longer term storage such as tape or optical disks. Requests are processed off the queue (or queues) in step 350 by the Retrieval Fulfillment module 225 which passes the request to AIM module 235 for retrieval of the document or file in step 360. After the document or file has been retrieved from the archives 100-106, it is first processed by the Output Control section 230 of the CPB 215 in step 370 and then passed onto the Output Processing section 210 of the BAIM 200 for final preparation for presentation to the user in step 380.

As described above, the BAIM module 200 receives requests for archived information from customers 150, 160 and transmits the retrieved information back to the customer 150, 160. BAIM 200 accomplished these functions by its Input 205 and Output 210 processing components. As described above with respect to FIG. 1, there are generally three types of business applications employed by users 150, 160 in communicating with the archive access manager 140 of the present invention: Internet/Intranet applications; Client-Server applications; and Messaging based applications. In a preferred embodiment, the present invention supports the following interface protocols: IP/HTTP, CORBA and IBM MQ Series, although the present invention can be modified to support virtually any interface protocol. XML data structures can be used within all interface messages.

Internet/Intranet applications use the IP/HTTP protocol and Internet Browsers (such as Netscape Navigator or Microsoft Internet Explorer). Intranet applications can be built with JAVA, C++, Javascript, Vbscripts, or other such languages. Client/Server applications require a communications network and a server for communicating with the archive access manager 140 from a user work-stations and can be built with programming tools such as Visual Basic, Visual C++, Visual FoxPro, PowerBuilder or JAVA.

Messaging systems such as IBM MQ Series or Microsoft MSMQ can also be used to communicate between a user applications and archive access manager 140. Such systems pass information from system to system using discrete messages. Messaging application systems may operate in asynchronous mode or real-time synchronous mode (e.g., via Tuxedo/M3, RPC calls, especially suited for overseas communications). Using messaging is a preferred method of communication with archive access manager 140 since messaging allows diverse platforms to communicate cost-effectively.

Both Input Processing 205 and Output Processing 210 sections of the BAIM 200 are queue driven. As a user logs onto system 140, the user is identified by its requestor application ID and assigned a request queue. The Input 205 and Output 210 Processing sections share the same queue in accordance with the requestor application ID. The queue structure allows for accurate tracking and auditing of the status of a request from a user. As requests come in from users, the Input Processing section 205 places the request on the queue assigned to the user and as the requested data comes back from the archives 100-106, the Output Processing section 210 marries up the retrieved information with the request.

Figure 4:
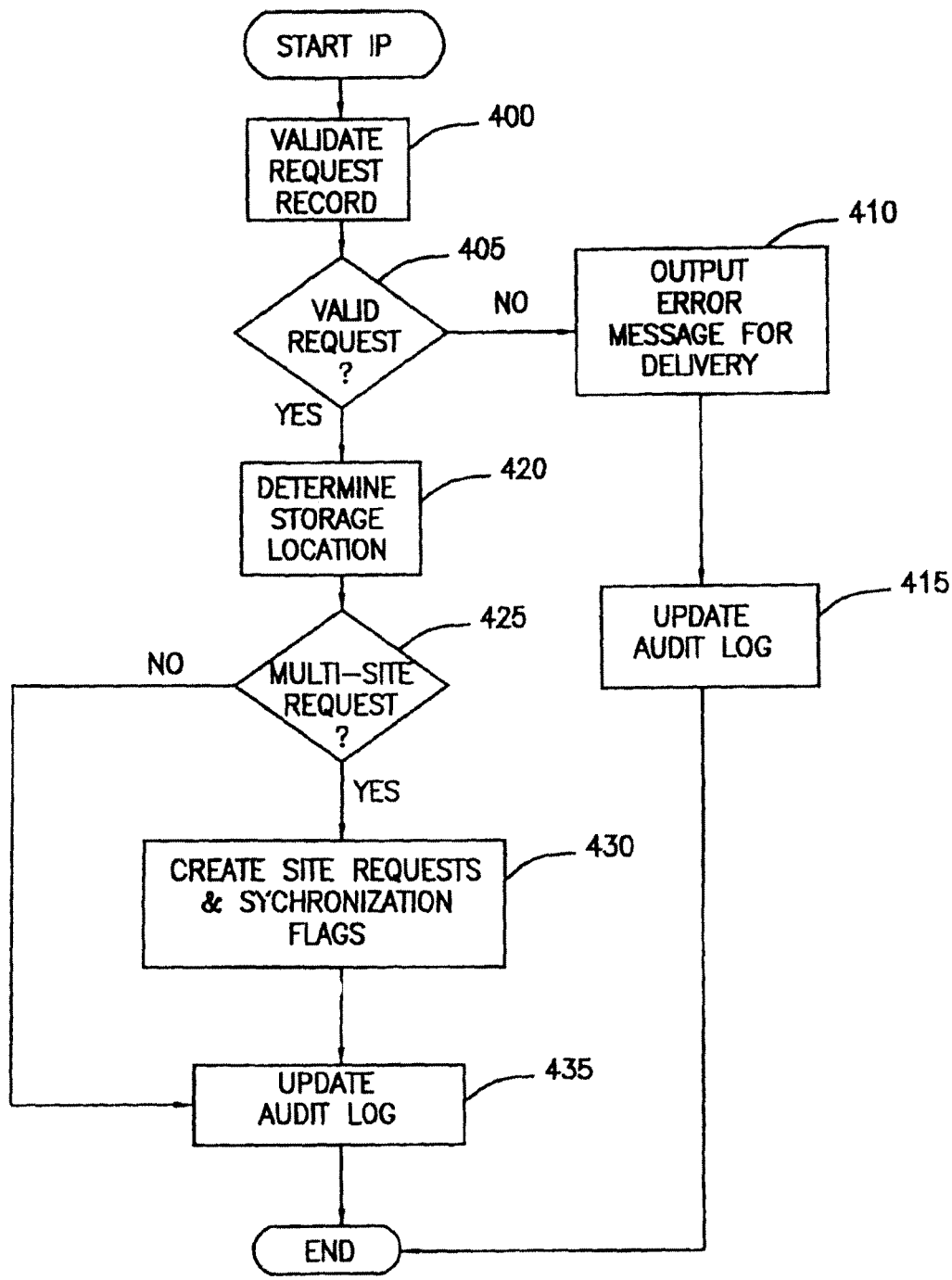
FIG. 4 illustrates the processing that occurs' in the Input Processing section of the Business Application Interface Manager.

FIG. 4 illustrates the processing that occurs in the Input Processing section 205 of the BAIM 200. One of the first functions of the Input Processing section 205 is to validate (steps 400-405) the format and contents of the request from a user. The request is determined to be invalid, the request is rejected and in step 410 an error message is generated from return to the user. The error message will inform the as to the reason(s) why the request was rejected. In step 415 the audit log for the system is updated with the fact that the request was rejected. The audit log is file which is updated for any significant event which occurs with respect to a request (e.g., the request was passed onto the next processing section). In validating the request, the Input Processing section 205 checks both the format and the content of the request.

In a preferred embodiment for requests for digital information, each request assembled and transmitted by the user's application 150, 160 contains the following fields: a request source area ID, the requestor application ID described above; an archive application ID; a request Date/Time; a request sequence number; a request type (Data or document/file); an Interface method; a service class; a delivery format; whether and what type of encryption is required; whether and what type of authentication is required; and a request parameter string. A preferred format of the information request entry is depicted in Table 3.

In step 420 depicted in FIG. 4, the Input Processing section 205 determines the storage location that has archived the data/document/file being requested by the user 150, 160. At the startup of system 14, a storage location table is created in system memory from the meta-descriptor tables. This table enable a high speed look-up of the storage locations of the information requested by the user. Table 4 depicts a preferred format of the archive location table. In the case of requests for analog information that does not have a digital index, the system is able to determine where to send the request from the user's id and the freeform information input by the user (e.g., date or date range for the information.

Figure 7:
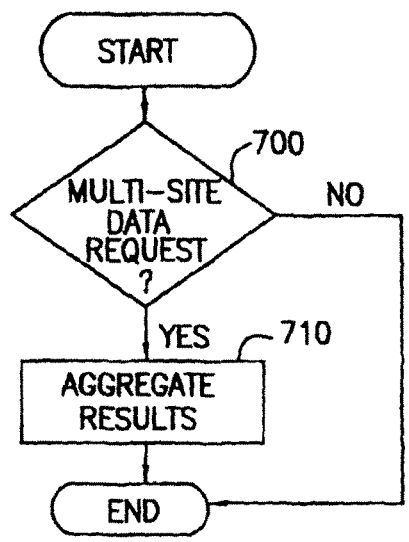
FIGS. 7 and 8 illustrate the processes of the Output Control Section of the Core Processing Block.

In step 425 it is determined if the request by the user requires the retrieval of information from multiple sites. This determination is accomplished from the results of the table look-up. If the information is located at only one archival site 100-106, the audit log is update in step 435 and the request is passed on the Core Processing Block 220 for fulfillment (see discussion below with respect to FIG. 7). If the request requires information from several sites 100-106, in step 430 the Input. Processing section 205 creates the requests for information from the multiple sites 100-106 and generates synchronization flags for the coordination of the requests and the retrieval of the information.

As the Core Processing Block 220 receives requests for information retrievals from the BAIM Input Processing section 205, the requests are queued by the Queue Management module 220. The service class contained in the request from the user 150, 160 is used by the Queue Management module 220 to set the priority the request. If the Queue Management module 220 has calculated that there will be a delay with respect to fulfilling the request (with respect to the priority indicated by the user in the assignment of the service class) the Queue Management module 220 sends an advice message to the output queue (see below) for immediate delivery to the requesting application.

Figure 5:
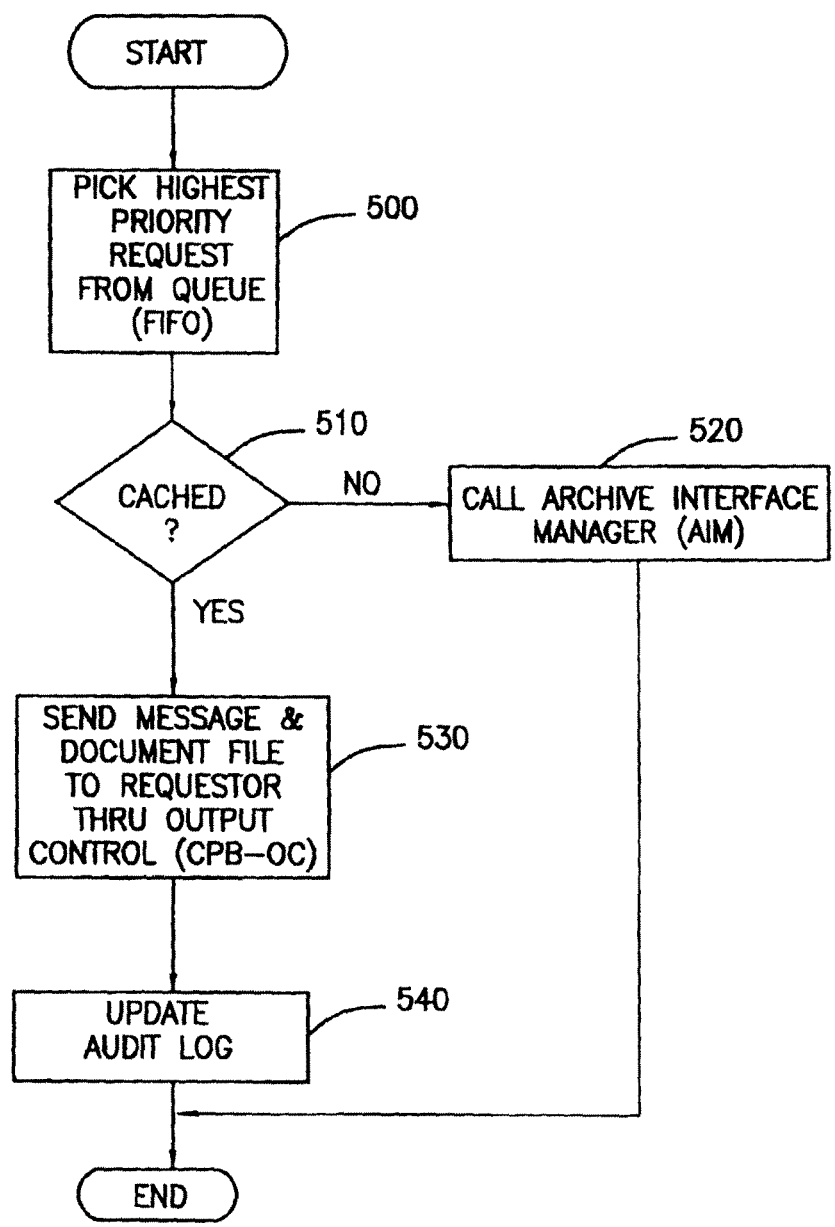
FIG. 5 depicts the process followed by the Retrieval Fulfillment module.

The Process Retrieval Fulfillment module 255 is responsible for processing the requests from the queues established by the Queue Management module 220. The process followed by the Retrieval Fulfillment module 225 is illustrated in FIG. 5. In step 500, the Retrieval Fulfillment module 225 retrieves the request with the highest priority from the queue. In step 510, it is determined whether the requested information has previously been retrieved and is already cached by the system 140. The caching feature of the present invention is more fully described below with respect to the cache control module 255 (see FIG. 2). If the information is not found in the cache, the Retrieval Fulfillment module 225 calls the Archive Interface manager 235 to perform the actual retrieval function (see FIG. 6 and associated description). If the information has been cached, the Retrieval Fulfillment module 225 retrieves the document or file from the cache in step 530 and returns it with a message to the Output Control 230 of the CPB 215 for eventual transmittal back to the requesting user 150, 160 as described below. As with any substantive action by system 140, the audit log is updated in step 540.

Figure 6:
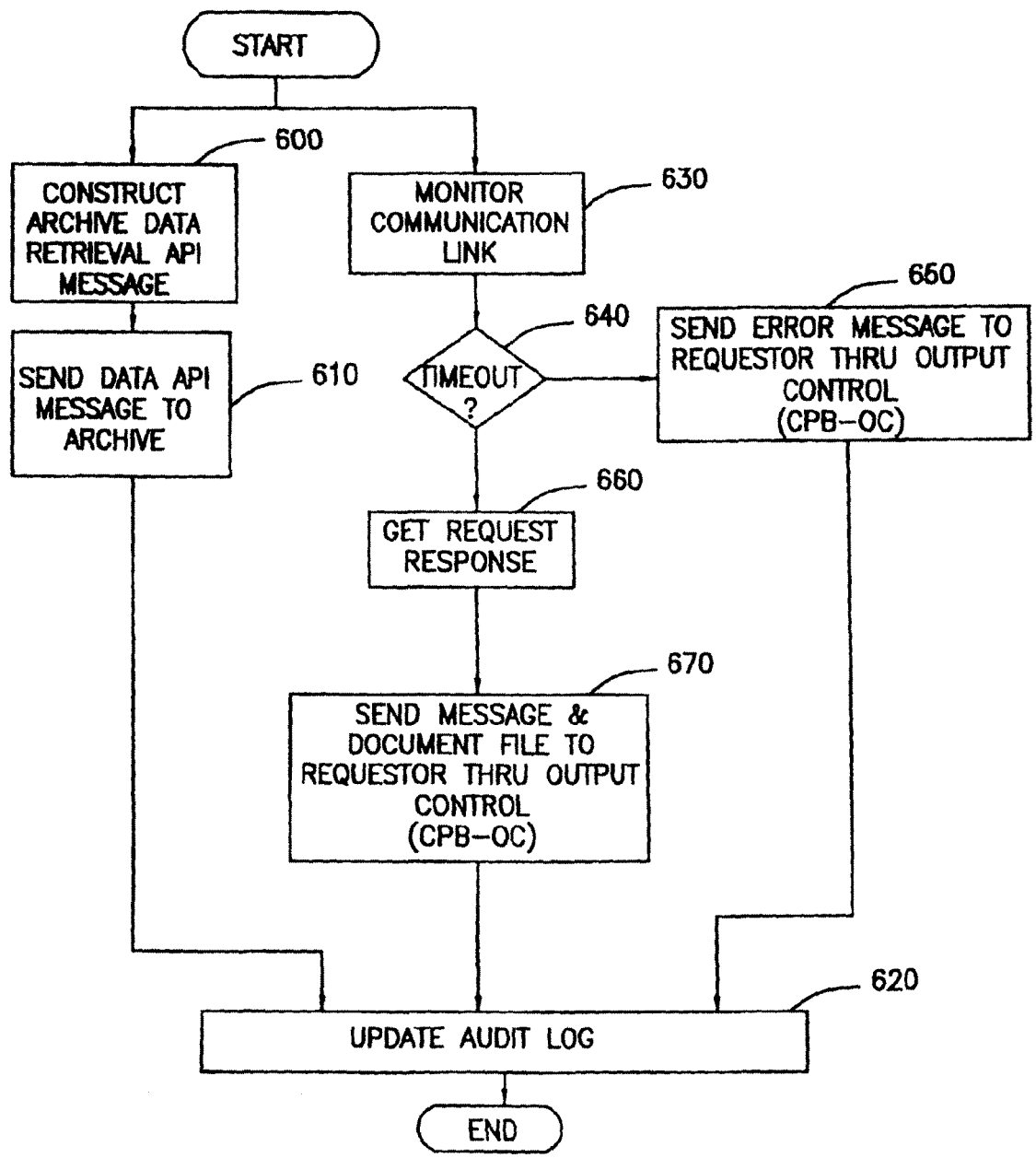
FIG. 6 shows the processes flow performed by the Archive Interface Manager.

The processes flow performed by the Archive Interface Manager (AIM) 235 is depicted in FIG. 6. As with the other modules, the AIM 235 is queue driven. There is one retrieval queue for each Archive Application ID. Furthermore, there is one instance of the AIM module 235 for each Archive Application ID. The Archive Application IDs represent a logical storage folder. For example, corporate checks might be associated with a first Archive Application ID and bank DDA statements might be assigned to the second different Archive Application ID. Each archive location typically has one or more physical archives and each of the physical archives typically has many Archive Application IDs. For example if there are two archival locations, each with four Archive Application IDs, there will be eight retrieval queues and eight instances of AIM 235 servicing those queues. The AIM 235 performs two general operations, one for sending request messages and one for retrieving the results of the request. In step 600, AIM 235 constructs a retrieval message based on a request received from the Retrieval Fulfillment module 225. In step 610, the retrieval message is through the messaging system to the archive 100-106 that contains the requested data and the audit log is updated in step 620 to reflect the fact that the request message has been sent to the archive 100-106.

In order to look for the responses to the request messages, AIM 235 monitors the communication link each of the archives responses in step 620. If AIM 235 detects that the communications link is disconnected, it sends message to Administrative Manager 240 (see FIG. 2). In step 640, if the time for the expected response from an archive 100-106 has expired, AIM 235 generates an error message in step 650 which is subsequently transmitted back to the user 150,160. AIM 235 maintains a timeout value for each retrieval request and monitors the physical communication link for the messages In step 660, AIM 235 has successfully received the requested document/file from the archive 100-106 and forwards the retrieved document/file to the Output Control module 230 for eventual transmittal back to the user 150, 160.

Figure 8:
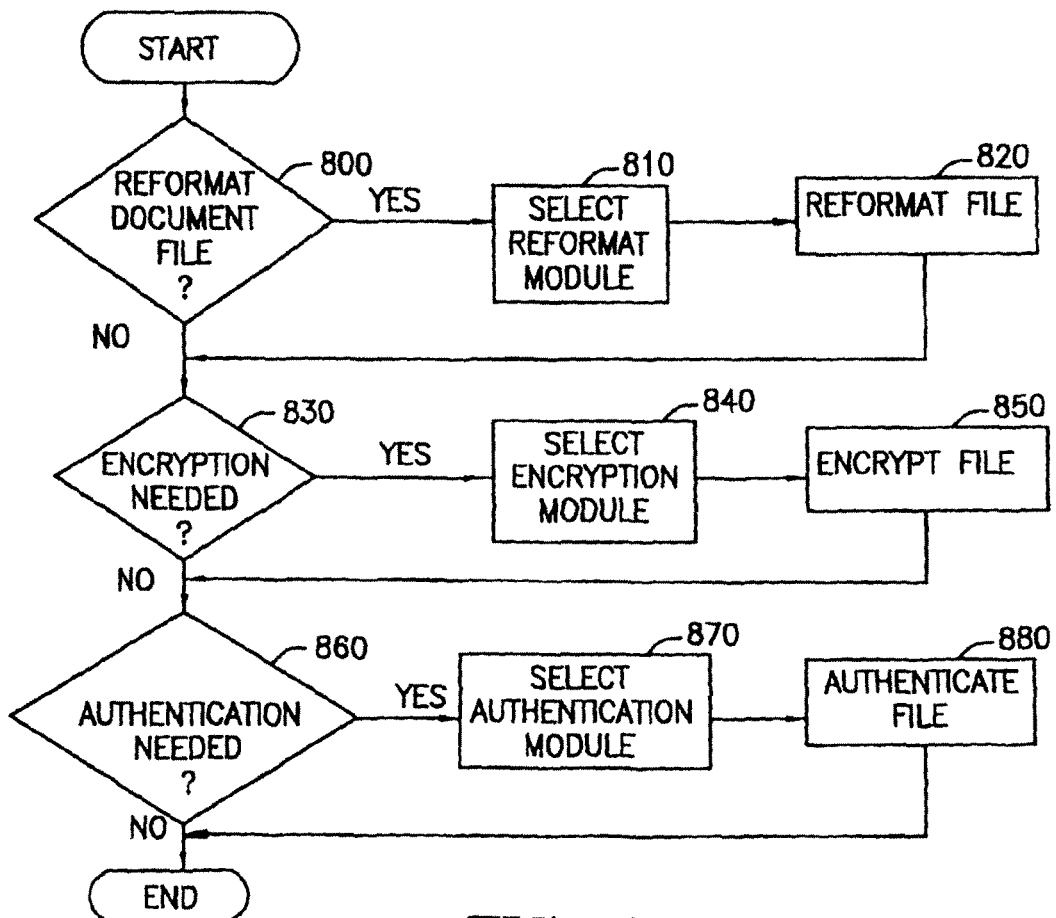

The Output Control section 230 of the CPB 215 (see FIG. 2) performs two separate routines. In the first routine illustrated in FIG. 7, the Output Control Section 230 determines in step 710 whether the document/file received from AIM 235 is part of a multi-site request. If the data is not part of a multi-site request, control is passed to the second routine illustrated in FIG. 8. If the data is part of a multi-site request, the Output Control Section 230 waits until all of the data has been retrieved and then in step 710 aggregates the results. As illustrated in FIG. 8, the Output Control Section 230 further performs several formatting functions with respect the retrieved data. In step 800 the actual format of the retrieved object is determined and checked against the requested delivery format required by the user 150, 160. If reformatting of the document/file (e.g., image) is required, the appropriate reformatting module is selected in step 810 which reformats the data in step 820.

In step 830, the Output Control Section 230 determines if encryption is required with respect to the retrieved data. The user 150,160 specifies in the original request whether the data as returned to the user 150, 160 needs to be encrypted and the type of encryption required. In step 840 the appropriate encryption module is selected which obtain encryption key (located in a user profile and security table (not shown) and encrypts the retrieved document/file as specified by the user 150, 160. In step 860 it is determined if the authentication is required. Again, the user 150,160 in the original request specifies if authentication is requires. In step 870, the appropriate authentication module is selected which obtain authentication key or digital certificate and authenticates document/file in step 880.

Figure 9:
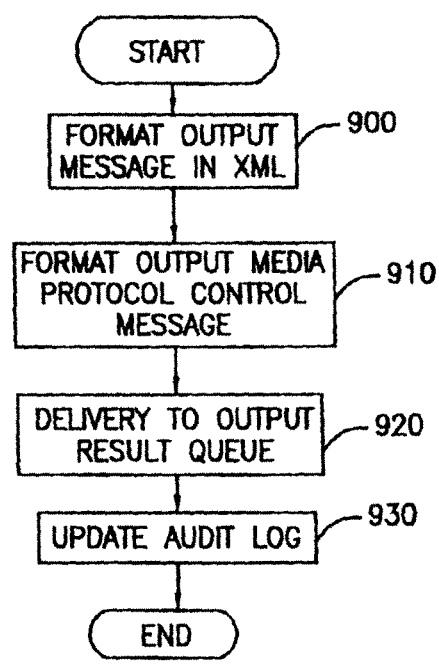
FIG. 9 depicts the process followed by the Output Processing module of the Business Application Interface Manager.

Documents/files which have been processed (reformatted, encrypted and or authenticated) by the Output Control Section 230 of the Core Processing Block 215 are placed on an output result queue for transmission back the requesting user 150,160 by the Output Processing module 210 of the BAIM 200. The process followed by the Output Processing module 210 is shown in FIG. 9. In step 900, the output message containing the retrieved document/file is formatted in XML or other alternative message format. The XML message is then incorporated in a message formatted in step 910 for the particular communication media employed by the user 150,160 (e.g., IP/HTTP, CORBA, MQ Series, etc). The properly formatted message is then delivered in step 920 for delivery to the user 150, 160 thus completing the request operation. As always, the audit log is updated reporting the successful fulfillment of the retrieval request.

FIG. 2 additionally illustrated the administrative functions employed in the archive access system 140 of the present invention. The Statistical Analysis section 245 of the Administrative manager 240 performs various statistical analysis functions including performance measurement & prediction. This function is primarily accomplished by extracting data from the audit log. Some of the useful statistical information which is generated from the audit log includes the access duration and time for each user, and by application ID; the number of documents accessed for each user, and by application ID; and the response time for each access for each user, and by application ID. Each of these statistics is useful in determining the loads, peak times and responsiveness of the system 140 in order that the system may be adjusted in response to the observed performance.

The Statistical Analysis section 245 maintains a statistical data warehouse. From this data, performance predictive profiles can be created, which, for each application, can calculate the average response time for standard DASD retention period and a tape retention period. Statistical analysis techniques are employed that provide the requester with predicted response time based on historical performance of request queues. Depending on the requested object type, storage media of the requested object, overall archive workload factors and equipment (number of availability of tape drives), etc., the response time may be sub-second or several minutes. Using empirical performance statistics, multiple performance profile models (PPM's) are developed. Each retrieval request is classified with a matching PPM, and a delay factor (in seconds or minutes) is sent to the requesting application or user whenever response delays are expected The Statistical Analysis section 245 further generates and maintains billing statistics from which it creates billing reports and output files for use by management.

The Priority Administration section 250 allows the manual intervention to change the priority number (01-99) for an individual request or a group of requests. This function allows dynamic priority re-assignment during periods where heavy request volumes are creating request backlogs.

As described above, the system 140 caches the most recently retrieved information in order enhance the performance of the system. Often, repeated requests for the same information are made with the same day, week or month. Caching Control module 255 is responsible for maintaining the cached information. Caching control module 255 actively manages the cache retention schedule in which the duration of the caching of particular information varies by the archive application. Different schedule of retention are determined for different types of information based on the pattern of requests for the information. In addition to caching new documents, the Caching Control module 255 is responsible for cleaning up cached documents whose retention period has expired.

Security Management section 260 is responsible for providing standard security administration services to Intranet applications as well as providing standard user sign-in security and checking the authenticity of the requesting business applications. One of the advantageous features of the present invention is that a user 150,160 needs only sign on to system 140 once and the Security Management section 260 is responsible for ensuring that the user 150,160 is authorized to retrieve the requested information. The user is not required to go through separate sign-on and password procedures for each of the archive systems 100-106 from which information is requested.

TABLE 1

| Data Element | Type | Comments |
| --- | --- | --- |
| Archive Application ID | Alphanumeric | Centrally assigned to each area Must match IBM OnDemand application ID |
| Application Name | Character | |
| Contact | Character | |
| Primary storage objects (up to 10 object types) | Alphanumeric | TIFF/JPEG, TIFF/G4 COF, TIFF/ABIC, IOCA/ABIC, MOD: CA/G4, JPEG, GIF, BLOB, AFP, Metacode, PostScript, PCL, PDF, ASCII, EBCDII, Word, Excel PowerPoint, HTML, XML, WAV, MP3 MPEG2, MPEG3, AVI |

TABLE 1-continued

| Data Element | Type | Comments |
|---|---|---|
| Primary Archive ID's (up to 10 archives) | Alphanumeric | Centrally assigned to each area<br>A1-Check archive Houston<br>A2-Check Archive-Somerset<br>B1-Customer archive-Houston<br>B2-Customer Archive-Wilmington<br>T1-Lockbox archive-UK<br>T2-Lockbox archive Hong Kong<br>T3-Disbursement archive-Syracuse |
| Backup Archive ID's (up to 10 archives) | Alphanumeric | Centrally assigned to each area<br>A1-Check archive Houston<br>A2-Check Archive-Somerset<br>B1-Customer archive-Houston<br>B2-Customer Archive-Wilmington<br>T1-Lockbox archive-UK<br>T2-Lockbox archive Hong Kong<br>T3-Disbursement archive-Syracuse |
| Cache rule-incoming new items | Numeric | No of days |
| Cache rule-retrieved items | Numeric | No of days |

TABLE 2

| Data Element | Type | Comments |
|---|---|---|
| Requestor Application ID | Alphanumeric | Centrally assigned to each area |
| Application Name | Character | |
| Contact | Alphanumeric | |
| Preferred interface protocol | Alphanumeric | |
| Application descriptions | Alphanumeric | |
| Storage encryption? | Logical | Yes or No |
| Delivery encryption enabled? | Logical | Yes or No |
| Delivery encryption type allowed* | Alphanumeric | |
| Delivery encryption key | Alphanumeric | Stored encrypted |
| Delivery authentication enabled? | Logical | Yes or No |
| Delivery authentication type allowed** | Alphanumeric | |
| Delivery authentication encryption key | Alphanumeric | Stored encrypted |

*Encryption Type
ENCRYPTDES = DES Encryption
ENCRYPTDES3 = Triple DES encryption
**Authentication Type
AUTHRSA = RSA Public key authentication
AUTHX509 = X.509 digital certificate authentication
AUTHDESMAC = DES MAC private key authentication

TABLE 3

| Data Element | Type | Comments |
|---|---|---|
| Request Source Area ID | Alphanumeric | Centrally assigned to each area |

TABLE 3-continued

| Data Element | Type | Comments |
|---|---|---|
| Requestor Application ID | Alphanumeric | Centrally assigned to each area |
| Archive Application ID | Alphanumeric | Centrally assigned to each area |
| Request Date/time | Numeric | |
| Request sequence number | Numeric | Sequence control number, assigned by requesting area. Incremented by 1 for each request. |
| Request type | Alphanumeric | D1 = Data record(s) only<br>F1 = Document file<br>F2 = Image File |
| Interface method | Alphanumeric | HTTP = IP/HTTP protocol<br>CORBA = CORBA protocol<br>MQ = MQ Series protocol |
| Service Class | Alphanumeric | Centrally assigned to each Requestor area.<br>1-10 Immediate delivery<br>11-20 Delayed delivery-same day<br>90-99 Overnight Delivery |
| Delivery Format | Alphanumeric | Blank = Original storage format (Default)<br>TIFF01 = TIFF/G4 or TIFF/JPEG<br>TIFFG4 = TIFF/ITU G4 only<br>JPEG = JPEG only<br>TIFFJPEG = TIFF/JPEG<br>PDF = Adobe PDF only |
| Delivery Encryption | Alphanumeric | Blank = (Default)<br>ENCRYPTDES = DES Encryption<br>ENCRYPTDES3 = Triple DES encryption |
| Delivery Authentication | Alphanumeric | Blank = (Default)<br>AUTHRSA = RSA Public key authentication<br>AUTHX509 = X.509 digital certificate authentication<br>AUTHDESMAC = DES MAC private key authentication. |
| Request parameter string | Text string | SQL statement string |

TABLE 4

| Data Element | Type | Comments |
|---|---|---|
| Archive ID | Alphanumeric | Centrally assigned to each archive |
| Archive Name | Character | |
| Physical address | Alphanumeric | e.g. IPxxx.xxx.xx.xx physical address |
| Interface module name | Alphanumeric | Name of the custom connector module |
| Interface method | Alphanumeric | HTTP = IP/HTTP protocol<br>CORBA = CORBA protocol<br>MQ = MQ Series protocol |
| Archive Platform | Alphanumeric | A1 = IBM OnDemand on AIX<br>A2 = IBM OnDemand on Solaris<br>B1 = Sybase/AMASSS on Solaris |
| Archive Status | Character | Active<br>Inactive |

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A method for enabling data access from a remote computing device, the method comprising the steps of:
accessing and executing instructions stored in at least one hardware storage device, using at least one computer processor to perform steps including:
receiving a data access request for a plurality of data objects, including a first data object and a second data object;
selecting a plurality of distributed remote data repositories storing said plurality of data objects based on the data access request;
generating a request at a first retrieval queue for the first data object;
generating a request at a second retrieval queue for the second data object;
concurrently processing the requests in the first retrieval queue and the second retrieval queue;
determining the format of retrieved data objects;
comparing the retrieved object format against a delivery format required by the data access request;
when the delivery format does not match the retrieved object format, reformatting the retrieved data object to comply with the request.

2. The method of claim 1, wherein the data object is an analog document and the reformatting comprises digitizing the document.

3. The method of claim 1, further comprising providing the requestor with an index for locating the requested data.

4. The method of claim 1, further comprising validating the format and content of the requested data object.

5. The method of claim 1, wherein the request has a request type and a delivery format.

6. The method of claim 1, further comprising determining if encryption is required with respect to the retrieved data object and encrypting the retrieved data object when encryption is required.

7. The method of claim 1, further comprising creating an output message containing the retrieved data object and incorporating the output message in a message formatted for a communication media employed by the requestor.

8. The method of claim 1, further comprising determining a requesting application responsible for generating the request.

9. The method of claim 1, further comprising storing the data object in multiple geographically distributed archives.

10. The method of claim 9, further comprising implementing an archive access system to retrieve the data object from the geographically distributed archives.

11. The method of claim 10, wherein the archive access system comprises two archive access managers located at different physical sites.

12. The method of claim 1, further comprising generating a plurality of service requests for retrieval of the requested data object, wherein the requested data object is located at two or more repositories of said plurality of distributed remote data repositories and each of said plurality of generated service requests is for retrieval of a portion of the requested data object.

13. A system for enabling data access from a remote computing device, the system comprising:
at least one hardware storage device storing data and instructions; and
at least one computer processor for accessing the instructions and data to perform steps including:
receiving a data access request for a plurality of data objects, including a first data object and a second data object,
selecting a plurality of distributed remote data repositories storing said plurality of data objects based on the data access request;
generating a request at a first retrieval queue for the first data object;
generating a request at a second retrieval queue for the second data object;
concurrently processing the requests in the first retrieval queue and the second retrieval queue based on a priority,
determining the format of the retrieved data object;
comparing the retrieved object format against a delivery format required by the data access request;
when the delivery format does not match the retrieved object format, reformatting the retrieved data object to comply with the request.

14. The system of claim 13, wherein the data object is an analog document and the reformatting comprises digitizing the document.

15. The system of claim 13, further comprising providing the requestor with an index for locating the requested data.

16. The system of claim 13, further comprising validating the format and content of the requested data object.

17. The system of claim 13, wherein the request has a request type and a delivery format.

18. The system of claim 13, further comprising determining if encryption is required with respect to the retrieved data object and encrypting the retrieved data object when encryption is required.

19. The system of claim 13, further comprising creating an output message containing the retrieved data object and incorporating the output message in a message formatted for a communication media employed by the requestor.

20. The system of claim 13, further comprising determining a requesting application responsible for generating the request.

21. The system of claim 13, further comprising storing the data object in multiple geographically distributed archives.

22. The system of claim 21, further comprising implementing an archive access system to retrieve the data object from the geographically distributed archives.

23. The system of claim 22, wherein the archive access system comprises two archive access managers located at different physical sites.

24. The system of claim 13, wherein the at least one computer processor for accessing the instructions and data generates a plurality of service requests for retrieval of the requested data object, and wherein the requested data object is located at two or more repositories of said plurality of distributed remote data repositories and each of said plurality of generated service requests is for retrieval of a portion of the requested data object.

25. A method for enabling data access from a remote computing device, the method comprising the steps of:
accessing and executing instructions stored in at least one hardware storage device, using at least one computer processor to perform steps including:
receiving a data access request for information stored at a plurality of distributed remote data repositories from the remote computing device, said information comprising a first portion stored at least at a first repository and a second portion stored at least at a second repository;

selecting the first repository and the second repository;
generating a request at a first retrieval queue for the first portion;
generating a request at a second retrieval queue for the second portion;
concurrently processing the requests in the first retrieval queue and the second retrieval queue based on a priority associated with the first portion and the second portion,
determining the format of the retrieved information;
comparing the retrieved object format against a delivery format required by the data access request;
reformatting the retrieved information to comply with the request if the delivery format does not match the retrieved object format.

* * * * *